United States Patent [19]

Lehmann et al.

[11] Patent Number: 4,861,462
[45] Date of Patent: Aug. 29, 1989

[54] METHOD OF FORMING SIEVE UNIT FOR SCREENING MACHINE

[75] Inventors: Wolfgang Lehmann, Oberndorf-Kuppenheim; Christian Neukam, Karlsruhe, both of Fed. Rep. of Germany

[73] Assignee: Hein, Lehmann AG, Dusseldorf, Fed. Rep. of Germany

[21] Appl. No.: 96,035

[22] Filed: Sep. 11, 1987

Related U.S. Application Data

[63] Continuation-in-part of Ser. No. 859,129, May 2, 1986, abandoned.

[30] Foreign Application Priority Data

May 3, 1985 [DE] Fed. Rep. of Germany ....... 3515937

[51] Int. Cl.$^4$ .................... B07B 1/30; B07B 1/46; B29C 63/44; B29C 65/04
[52] U.S. Cl. .................... 209/269; 29/163.6; 29/448; 156/85; 209/379; 209/397; 264/238; 264/265; 264/271.1; 264/279; 264/294; 264/342 R; 264/345; 264/348; 264/DIG. 71
[58] Field of Search .................... 156/163; 264/271.1, 264/273, 252, 229, 342 R, 230, 263, 279.1, 279, 348, 345, DIG. 71, 294; 209/397, 399, 404, 405, 268, 269, 309, 379; 29/447, 448, 163.6

[56] References Cited

U.S. PATENT DOCUMENTS

| | | | |
|---|---|---|---|
| 2,004,110 | 6/1935 | Head | 156/163 |
| 2,194,551 | 3/1940 | Holman | 156/163 |
| 2,570,273 | 10/1951 | Pryor | 156/163 |
| 2,669,535 | 2/1954 | Orr | 156/163 |
| 3,387,075 | 6/1968 | Wilcox | 264/263 |
| 3,719,222 | 3/1973 | Hardong et al. | 264/273 |
| 3,792,774 | 2/1974 | Rosenblum | 209/495 |
| 4,058,883 | 11/1977 | Yoshida et al. | 29/448 |
| 4,219,412 | 8/1980 | Hassall | 209/399 |
| 4,505,812 | 3/1985 | Lees | 209/275 |
| 4,695,420 | 9/1987 | Grawey et al. | 264/342 R |

FOREIGN PATENT DOCUMENTS 2849838 9/1979 Fed. Rep. of Germany .
2240051 6/1982 Fed. Rep. of Germany .

Primary Examiner—Jan H. Silbaugh
Assistant Examiner—Neil M. McCarthy
Attorney, Agent, or Firm—Herbert Dubno

[57] ABSTRACT

A screen unit for a screening machine comprises a screen layer which is bonded to a screen frame spanning an opening thereof. The screen layer is uniformly heated before such bonding is effected so that cooling after bonding generates a tension in the screen layer to allow it to have a trampoline or drumhead vibratile action. The tension is maintained by a reinforcing frame embedded in the frame body.

15 Claims, 1 Drawing Sheet

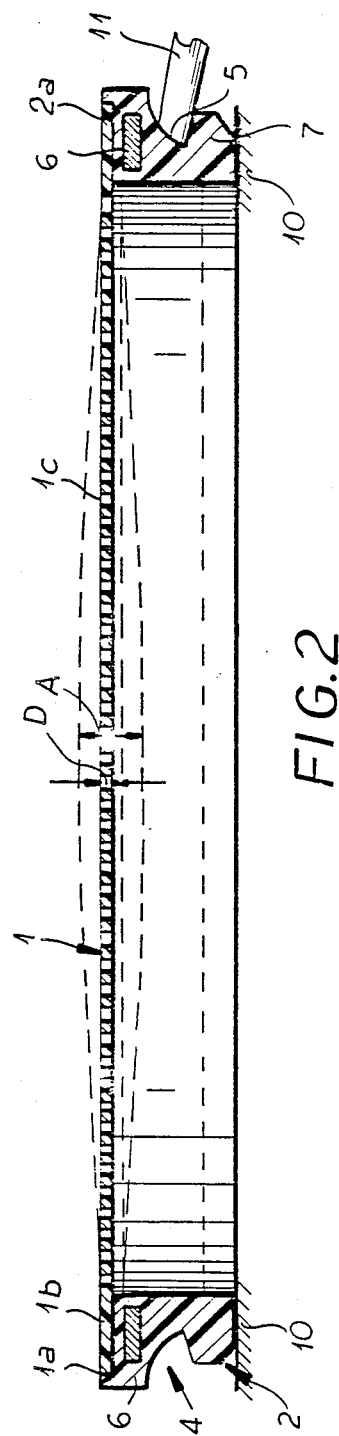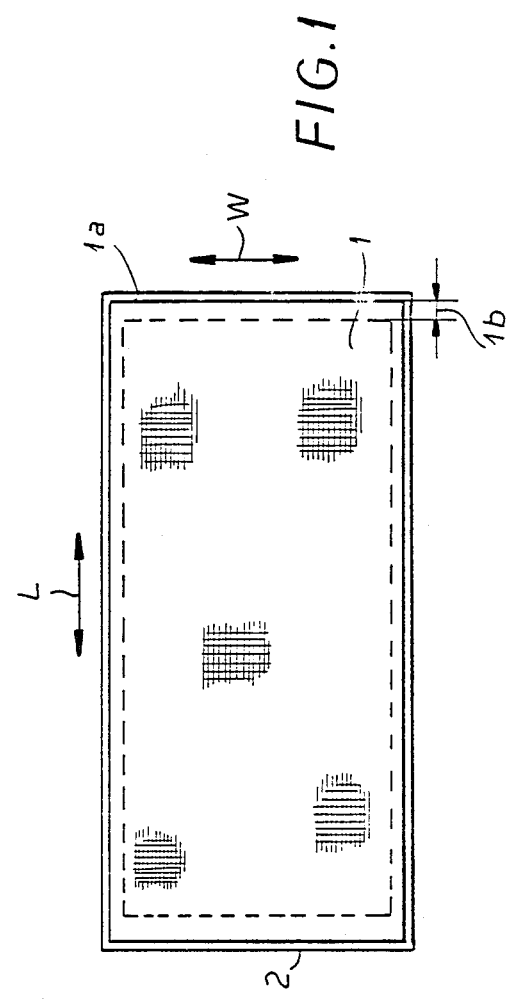

METHOD OF FORMING SIEVE UNIT FOR SCREENING MACHINE

CROSS REFERENCE TO RELATED APPLICATION

This application is a continuation-in-part of Ser. No. 859,129 filed 2 May 1986, now abandoned.

FIELD OF THE INVENTION

Our present invention relates to a sieve unit or element for use in a screening machine and to a method of making same. More particularly, the invention relates to the fabrication of a sieve unit or element which comprises a frame body having a thickness which can be at least several times greater than that of a screen layer spanning the opening of the frame body and bonded to the latter peripherally.

BACKGROUND OF THE INVENTION

German Open Application DE-OS No. 28 49 838 discloses a screening surface for a screening machine which is composed of a plurality of individual synthetic resin sieve elements or units assembled together in side-by-side relationship. The peripheral edge of each sieve unit is of much greater thickness than the screening surface or layer inwardly of this edge. The sieve surface has downwardly extending or projecting reinforcing ribs. The sieve surface, where it is thickened, forms substantially a rigid element and tends to vibrate like the edge of the element under the screening action generated in the screening machine. It is also known to reinforce the edges of a screen with reinforcing bars, e.g. of iron.

The dry screening of fine-grained materials, for example, crushed sand, with such screening elements or units can be effected in rainy seasons and periods of high atmospheric humidity only with relatively great difficulty. The mineral meal which is formed in the crushing process picks up moisture rapidly and tends to agglomerate and plug the openings of the screening surface. To prevent caking-up on the screening surface, a number of approaches have been proposed.

It has been suggested, for example, to provide the screening machine with crossbars which alternately compress and stretch the screening surface which, for that purpose, may be sufficiently flexible to enable it to sag between the crossbars.

Alternatively, where rod screens are used, i.e. so called harp screens, in which the individual wires develop a natural vibration in addition to the vibration imposed by the machine and because of this vibration keep the screen lining free from clogging, the wear of such screens is comparatively high.

Still another approach has been to provide plastic screens in which the individual screen openings are not made as square, round or rectangular holes, but rather are given a U-shape with a lip intended to form a natural vibratile element performing the function of the vibrating wire rod previously described and thus tending to free the screen surface of adherent material. The result of this vibration of a portion defining the screening opening, however, is a constant change in the dimensions of the opening and thus in the sieve size. The result is inaccuracy in the separation range or limit.

It has also been suggested to provide the screen layer as a plastic, thin perforated material which is fixed on a support only along its outer edges and otherwise rests loosely on the substructure of the screening machine. The vibrational movement of the machine here tends to cause movement of the looser areas of the screening material which repeatedly knocks against the understructure. The result is a fluttering movement of the material which is intended to bring about a self-cleaning effect. In many cases, however, the energy applied by the machine is inadequate to cause the material to undergo a fluttering movement. The fluttering movement also results in the application of bending stress to the material and material fatigue can develop therefrom so that premature breakage of the material may occur.

Finally, mention may be made of the use of rapping devices of various types, these devices being located beneath the screen lining and tend to counter the obstruction of the screening surface caused by the accumulation of moist fine material which is screened.

German Open Application DE-OS No. 22 40 051 also describes a screening surface which is maintained under tension. The maintaining of such a screening surface is difficult, complex and expensive. For the fabrication of such screening units, it has been proposed to tension a rectangular screen layer elastically by drawing opposite edges thereof apart mechanically and then to affix this screen layer to a rigid frame by cementing, nailing, screws or like means. This arrangement only results in the elastic elongation of the center zone perpendicular to the lateral edges of the screening surface which is formed.

The further one goes from the central region, the less is the tension. With tension elements such as round-section rods on all four sides, the sieve fabric can be stretched, but it is not possible with this approach to ensure a uniform distribution of tension over the entire surface.

The mechanical tension can be applied by levers or like mechanical mechanisms and pneumatic or hydraulic means, using clamping elements which engage limited areas along the outer edges of the screen layer and tug these edges outwardly. Not only is this a complicated and time-consuming process, but the apparatus required is expensive and it is not always possible to ensure a uniform tension. The clamping elements require over-dimensioning of the screening surface and frequently the screening layer must extend beyond the periphery of the frame and thus an excess must be cut off in a time-consuming process.

OBJECTS OF THE INVENTION

It is, therefore, the principal object of the present invention to provide an improved method of making a screening unit adapted t form a screening surface of a screening machine which obviates these drawbacks.

Another object of the invention is to extend the principles of our copending application Ser. No. 859,129.

It is also an object of the invention to simplify the fabrication of screening units or elements while nevertheless ensuring that they will not be plugged up by the material to be screened.

It is also an object of this invention to provide an improved screening unit.

SUMMARY OF THE INVENTION

These objects and others which will become more apparent hereinafter are attained, in accordance with our invention, by uniformly heating the screen layer of synthetic resin or elastomeric material before its attachment to the frame body over its entire area, thereby causing it to elongate in all directions, i.e. in both its length and width dimensions and, while the screen layer is thus elongated in all dimensions in its plane, securing its screen layer to a rectangular frame body over the rectangular opening thereof all around the periphery of the screen layer. Then the screen layer is cooled to generate a tension in the screen layer which acts substantially uniformly toward the center from all points on the periphery of the screen layer.

The uniform elongation of the screen layer is affected by a uniform heating thereof and thus generates a uniform elongation or extension in all four directions in the plane of the screen layer. The bonding of a rigid frame body to the screen layer which is provided with a reinforcing frame can ensure the permanent maintenance of the tension in the screen layer. In one embodiment of the method, the rigid reinforcing frame can be placed on the screen layer and the frame body can be cast in situ around the reinforcing frame to form a homogeneous unit bonded to the screen layer. After cooling of the screen layer, the latter is found to be tensioned uniformly in all directions in a drum-like manner.

The sieve unit, with its thin uniformly tensioned sieve layer is activated by the vibration of the screening machine on the one hand and the drumlike impact of the material to be screened on the other to generate an intrinsic vibration which ensures the desired screening effect. This permits the screening of materials which have been difficult to subject to screening processes heretofore with comparative ease, such materials including wet sand, materials with adhesive components and the like.

With the screen layer of the invention, therefore, it is not necessary to tension the entire screen surface of the machine, but rather to form screen units to accomplish the same or an improved effect using the tensioning of the screen layers of individual screen units. The vibration of the screening machine and the rhythmic striking of the screen surface by the material screen, similar to the vibrations generated in a trampoline, maintain the sieve openings free from obstruction.

At the same time, the method of the invention ensures that the screen surface can be assembled and dismantled with ease and in an inexpensive manner and further that with a minimum of wear, precisely define movements of the screen surface can be obtained.

According to a feature of the invention, the screen layer is elongated in at least one and preferably both of its length and width dimensions by at least 1% by the uniform heating of the screen layer.

When the frame body and the screen layer are fabricated separately, they can be joined by bonding them together with material of the frame body, e.g. by the formation of a heat seal.

The reinforcement can be steel or a glass-fiber-reinforced synthetic resin embedded in the material of the frame body.

In other alternatives, the screen layer can be affixed to the frame body by cementing, vulcanizing or fusion or melt bonding of the frame body to the screen layer.

The screen layer and frame body can be composed of the same material, e.g. polyurethane or rubber, and the frame body can be provided with formations, e.g. grooves or projections such as ribs, permitting the frame body to be maintained upon the screening machine.

BRIEF DESCRIPTION OF THE DRAWING

The above objects, features and advantages of our invention will become more readily apparent from the following description, reference being made to the accompanying drawing in which:

FIG. 1 is a plan view of a screen unit or element adapted to be disposed in side-by-side relationship with other such elements to form a continuous screening surface in a screening machine; and FIG. 2 is a cross-section view through the unit.

SPECIFIC DESCRIPTION

A screen layer 1 is provided with screen openings 1c of an appropriate mesh size and has a thickness of about 1–10 and preferably 1.5–4 mm. As a result of this comparatively small thickness, the screen is flexible and when placed under tension, the screen layer can vibrate within the window of a frame body 2 formed from edge profiles constituting the limbs of the rectangular frame.

The screen layer 1 is composed of a synthetic resin material or an elastomer, preferably polyurethane, and has a peripheral edge 1a which lies in a recess 2a, in an upper surface of the synthetic resin frame body 2 which also may be composed of polyurethane. The edge 1a is formed on a margin 1b of the screen layer 1 which overlies the upper surface of the frame body 2 and is fixed thereto all around the periphery. Attachment may be effected by melt or fusion bonding, by vulcanization, or by an adhesive, and can be accomplished, as has been described, by casting the body 2 onto the screen layer 1.

The frame body 2 has a rectangular reinforcing frame 3 embedded therein, the frame being composed of steel or glass fiber reinforced plastic, preferably a spring steel.

The reinforcement 3 maintains the tension on the screen layer 1 which is formed during fabrication of the spring unit by initially expanding or elongating the screen layer 1 in both the length (L) and the width (W) dimensions and therefore uniformly over the entire surface by heating the screen layer uniformly over its surface so that the elongation is at least 1% of the length and/or the width of the screen surface.

The heating can be effected by supporting the screen layer 1 on a heated surface. When the screen layer cools, after it has been attached to the frame body 2, the desired uniform tension in the plane of the screen body is generated.

The screen unit can thus be fabricated by separately making the screen layer 1 and the frame 3. The screen layer 1 is then placed upon an appropriately heated surface of the mold, the frame 3 is positioned within a mold cavity defining the shape of the frame body 2 and the mold is then filled with polyurethane which bonds to the frame 3 and the thermally elongated or expanded screen layer 1. After hardening of the frame body and removal from the mold, the cooling of the screen surface generates the tension in the screen layer which is maintained by the reinforcement 3 since the latter cannot be contracted by the tension force of the screen layer.

The screen layer 1 thus has the characteristic of a trampoline or drumhead so that vibration induced by the machine can cause a vibratile displacement with an amplitude A of the screening surface which is greater than the thickness D thereof.

The material of the frame body 2 not only bonds the screen layer 1 and frame together but also ensures that the entire screen element can be rigidly connected to the screening machine which is shown only in diagrammatic form at 10.

To this end, the lateral vertical ends 4 of the frame body can be provided with undercuts or recesses 5 in which clamping members 11 can engage between an upper projection 6 and a lower projection 7. In this manner, the frame body is clamped into the supporting surface of the machine 10. The frame 3 is located above the recess 5 and just beneath the edge of the screen surface, which edge can be free from screen openings so that maximum force transmission can be effected between the screen layer and the frame.

We claim:

1. A method of making a rectangular sieve unit for removable mounting in a screening machine, comprising the steps of:
   (a) forming a substantially rectangular frame body of a synthetic resin or elastomeric material with a reinforcement received therein, said frame body having a substantially rectangular window surrounded by said frame body;
   (b) uniformly heating a substantially rectangular screen layer of synthetic resin or elastomeric material with original length and width dimensions in excess of those of said window over the entire area of said screen layer thermally to elongate said screen layer in its length and with dimensions;
   (c) thereafter affixing said screen layer to said frame body across said opening all around the peripheries of said screen layer and said frame body;
   (d) thereafter cooling said screen layer while said screen layer is affixed to said frame body to contact said screen layer is its length and width dimensions and develop a screening tension in said layer of the sieve unit formed by said frame body and said layer and;
   (e) mounting said sieve unit in a screening machine for the screening of material by vibration of said layer.

2. The method defined in claim 1 wherein said screen layer is elongated in step (b) in at least one of its length and width dimensions by at least 1%.

3. The method defined in claim 1 wherein said frame body and said screen layer are fabricated separately and are joined in step (c) by bonded them with material of said frame body.

4. The method defined in claim 1 wherein said reinforcement is in the form of a four-side frame capable of permanently resisting a contraction force applied to said frame body by the tension in said screen layer, thereby maintaining said tension.

5. The method defined in claimed 4 wherein said frame is a steel or glass-fiber-reinforced synthetic resin frame embedded in the material of said body.

6. The method defined in claim 5 wherein said reinforcement is a spring-steel frame.

7. The method defined in claim 1 wherein said screen layer is affixed to said body in step (c) by placing a rigid reinforcing frame on the screen layer and casting said body around the reinforcing frame to form a unit bonded to said layer upon the elongation thereof.

8. The method defined in claim 1 wherein said screen layer is affixed to said body in step (c) by cementing said frame body to said screen layer.

9. The method defined in claim 1 wherein said screen layer is affixed to said body in step (c) by vulcanizing said frame body to said screen layer.

10. The method defined in claim 1 wherein said screen layer is affixed to said body in step (c) by fusing and melt-bonding said frame body to said screen layer.

11. The method defined in claim 1 wherein said screen layer and said frame body are composed of the same material.

12. The method defined in claim 11 wherein the screen layer and the frame body are composed of polyurethane.

13. The method defined in claim 11 wherein the screen layer and the frame body are composed of a rubber.

14. The method defined in claim 1 wherein said frame body is provided with formations enabling the mounting of the unit on a screening machine.

15. A method of screening wetted fine-grained materials which prevents the caking-up of the materials on a screening surface comprising feeding of said wetted fine-grained materials to said screening surface of a rectangular sieve unit removably mounted in a screening machine and vibrating said surface, said rectangular sieve unit being constructed through the steps comprising:
   (a) forming a substantially rectangular frame body of a synthetic resin of elastomeric material with a reinforcement received therein, said frame body having a substantially rectangular opening surrounded by said frame body;
   (b) uniformly heating a substantially rectangular screen layer of synthetic resin or elastomeric material with original length and width dimensions in excess of those of said opening uniformly over the entire area of said screen layer thermally to uniformly elongate said screen layer in its length and width dimensions;
   (c) thereafter affixing said screen layer to said frame body across said opening all around the peripheries of said screen layer and said frame body;
   (d) thereafter cooling said screen layer while said screen layer is affixed to said frame body to contract said screen layer in its length and width dimensions and develop a screening tension permitting vibration in said layer of the sieve unit formed by said frame body and said layer; and
   (e) vibrating said layer to screen material therewith.

* * * * *